United States Patent [19]

Lubowitz et al.

[11] Patent Number: 4,584,364
[45] Date of Patent: Apr. 22, 1986

[54] PHENOLIC-CAPPED IMIDE SULFONE RESINS

[75] Inventors: Hyman R. Lubowitz, Rolling Hill Estates, Calif.; Clyde H. Sheppard, Bellevue, Wash.

[73] Assignees: The Boeing Company, Seattle, Wash.; TRW, Inc., Redondo, Calif. ; a part interest to each

[21] Appl. No.: 673,229

[22] Filed: Nov. 20, 1984

Related U.S. Application Data

[63] Continuation of Ser. No. 576,790, Feb. 6, 1984, abandoned, which is a continuation-in-part of Ser. No. 321,119, Nov. 13, 1981, abandoned.

[51] Int. Cl.$^4$ .............................................. C08G 73/10
[52] U.S. Cl. ................................ 528/128; 428/473.5; 528/125; 528/172; 528/210
[58] Field of Search ............... 528/172, 125, 128, 210; 428/473.5

[56] References Cited

U.S. PATENT DOCUMENTS

| | | |
|---|---|---|
| 3,236,808 | 2/1966 | Goldberg et al. . |
| 3,236,808 | 2/1966 | Goldberg et al. .................... 528/175 |
| 3,262,914 | 7/1966 | Goldberg et al. . |
| 3,262,914 | 7/1966 | Goldberg ............................ 528/173 |
| 3,265,708 | 8/1966 | Stiteler . |
| 3,355,272 | 11/1967 | D'Alessandro . |
| 3,355,272 | 11/1967 | D'Alessandro ....................... 51/298 |
| 3,453,236 | 7/1969 | Culbertson ........................... 528/185 |
| 3,454,673 | 7/1969 | Schmidt et al. . |
| 3,530,087 | 9/1970 | Hays et al. . |
| 3,530,087 | 9/1970 | Hays ................................... 528/109 |
| 3,536,670 | 10/1970 | Aelony et al. . |
| 3,549,231 | 12/1970 | Scidmore et al. . |
| 3,562,223 | 2/1971 | Bargain et al. ....................... 528/322 |
| 3,563,951 | 2/1971 | Radlmann et al. . |
| 3,631,222 | 12/1971 | Vogel et al. . |
| 3,631,222 | 12/1971 | Vogel et al. ......................... 525/419 |
| 3,641,207 | 2/1972 | Lauchlan et al. . |
| 3,641,207 | 2/1972 | Lauchlan ............................. 260/876 |
| 3,652,710 | 3/1972 | Holub et al. . |
| 3,652,710 | 3/1972 | Holub et al. ......................... 260/823 |
| 3,658,938 | 4/1972 | Kwiatkowski et al. . |
| 3,658,938 | 4/1972 | Kwiatkowski et al. ............. 528/353 |
| 3,663,507 | 5/1972 | Vogel et al. . |
| 3,663,507 | 3/1972 | Vogel .................................. 528/174 |
| 3,699,075 | 10/1972 | Labowitz et al. . |
| 3,708,439 | 1/1973 | Sayigh et al. . |
| 3,708,439 | 1/1973 | Sayigh et al. ....................... 528/172 |
| 3,729,446 | 4/1973 | Holub et al. . |
| 3,761,441 | 9/1973 | D'Alessandro et al. . |
| 3,763,101 | 10/1973 | Jones et al. . |
| 3,763,101 | 10/1973 | Jones .................................. 528/171 |
| 3,770,697 | 11/1973 | Holub et al. . |
| 3,773,718 | 11/1973 | Klebe et al. . |
| 3,773,718 | 11/1973 | Klebe et al. ........................ 528/170 |
| 3,787,363 | 1/1974 | Staniland et al. . |

(List continued on next page.)

OTHER PUBLICATIONS

Sheppard, C. H., House, E. E. and Stander, M., "Advanced Thermoplastic Composite Development", 38th Annual Conference, Reinforced Plastics Composites Institute, The Society of the Plastic Industry Inc., Feb. 16–20, 1981.

Jaquish, J., Sheppard, C. H., Hill, S. G., House, E. E., Synond, W. A., "Graphite Reinforced Thermoplastic Composites", Final Report on Contract N00019-79-C 0203, Boeing Aerospace Company, Seattle, Washington, 98124, Aug. 1980.

Sheppard, C. H. and House, E. E., "Development of Modified Polysulfone Resins", Final Report on Contract N00019-80-C-0609, Boeing Aerospace Company, Seattle, Washington 98124, Dec. 1981.

*Primary Examiner*—Lester L. Lee
*Attorney, Agent, or Firm*—Finnegan, Henderson, Farabow, Garrett & Dunner

[57] ABSTRACT

A cross-linkable oligomer is formed by reacting polysulfone or polyethersulfone compounds holding two amino groups, aliphatic and/or aromatic compounds containing two anhydride groups, and an amino-phenol. The resulting oligomer has a molecular weight between about 800 and 5000, preferably between about 1000 and 2500, and can be coreacted with an aldehyde and thermally cross-linked to form a cured, thermally stable, solvent-resistant product. The curing reaction mixture preferably also includes a promotor.

13 Claims, 1 Drawing Figure

U.S. PATENT DOCUMENTS

| | | |
|---|---|---|
| 3,787,363 | 1/1974 | Staniland et al. ............... 528/174 |
| 3,803,081 | 4/1974 | Lubowitz et al. . |
| 3,812,159 | 5/1974 | Lobowitz . |
| 3,812,159 | 5/1974 | Lubowitz ........................ 549/241 |
| 3,839,287 | 10/1974 | Kwiatkowski et al. . |
| 3,839,287 | 10/1974 | Kwiatkowski et al. ........... 528/172 |
| 3,859,252 | 1/1975 | Cho . |
| 3,879,349 | 4/1975 | Bilow et al. . |
| 3,879,349 | 4/1975 | Bilow et al. ................... 528/353 |
| 3,897,393 | 7/1975 | Lee . |
| 3,897,393 | 7/1975 | Lu .............................. 528/170 |
| 3,897,395 | 7/1975 | D'Alelio . |
| 3,897,395 | 7/1975 | D'Alelio ...................... 528/172 |
| 3,897,753 | 8/1975 | Lee et al. . |
| 3,920,768 | 11/1975 | Kwiatkowski . |
| 3,920,768 | 11/1975 | Kwiatkowski ................. 525/421 |
| 3,935,167 | 1/1976 | Marvel et al. . |
| 3,935,167 | 1/1976 | Marvel et al. ................ 528/125 |
| 3,956,320 | 5/1976 | Heath et al. . |
| 3,957,862 | 5/1976 | Heath et al. . |
| 3,970,714 | 7/1976 | Bargain . |
| 3,970,714 | 7/1976 | Bargain ....................... 528/170 |
| 3,972,902 | 8/1976 | Heath et al. . |
| 3,975,862 | 8/1976 | Doan . |
| 3,988,374 | 10/1976 | Brode et al. . |
| 3,993,630 | 11/1976 | Darmory et al. . |
| 3,998,786 | 12/1976 | D'Alelio et al. . |
| 4,000,146 | 12/1976 | Gerber . |
| 4,000,146 | 5/1977 | Gerber ......................... 546/255 |
| 4,005,134 | 1/1977 | Markezich . |
| 4,020,069 | 4/1977 | Johnson et al. . |
| 4,026,871 | 5/1977 | D'Alelio ....................... 528/172 |
| 4,026,871 | 5/1977 | D'Alelio . |
| 4,026,871 | 5/1977 | D'Alelio ....................... 528/353 |
| 4,058,505 | 11/1977 | D'Alelio . |
| 4,060,515 | 11/1977 | D'Alelio . |
| 4,060,515 | 11/1977 | D'Alelio ....................... 528/353 |
| 4,064,289 | 12/1977 | Yokoyama et al. ............. 528/172 |
| 4,064,289 | 12/1977 | Lukoyama et al. . |
| 4,097,456 | 6/1978 | Barie . |
| 4,097,456 | 6/1978 | Barie .......................... 528/125 |
| 4,100,137 | 7/1978 | Lemieux et al. . |
| 4,100,138 | 7/1978 | Bilow . |
| 4,100,138 | 7/1978 | Bilow et al. .................. 526/262 |
| 4,101,488 | 7/1978 | Ishiyuka . |
| 4,101,488 | 7/1978 | Ishizuka ....................... 528/170 |
| 4,107,153 | 8/1978 | Akiyama . |
| 4,107,153 | 8/1978 | Akiyama et al. ............... 524/592 |
| 4,108,837 | 8/1978 | Johnson . |
| 4,108,837 | 8/1978 | Johnson et al. ................ 528/126 |
| 4,108,926 | 8/1978 | Arnold . |
| 4,108,926 | 8/1978 | Arnold et al. ................. 525/534 |
| 4,115,231 | 9/1978 | Darms . |
| 4,115,231 | 9/1978 | Darms et al. .................. 528/170 |
| 4,116,937 | 9/1978 | Jones . |
| 4,116,937 | 9/1978 | Jones et al. .................. 526/262 |
| 4,126,619 | 11/1978 | Darms et al. . |
| 4,126,619 | 11/1978 | Darms et al. .................. 528/271 |
| 4,128,574 | 12/1978 | Markezick et al. . |
| 4,166,168 | 8/1979 | D'Alelio . |
| 4,166,168 | 8/1979 | D'Alelio ....................... 525/426 |
| 4,168,366 | 9/1979 | D'Alelio . |
| 4,168,366 | 9/1979 | D'Alelio ....................... 528/125 |
| 4,175,175 | 11/1979 | Johnson et al. . |
| 4,176,223 | 11/1979 | Irwin . |
| 4,179,551 | 11/1979 | Jones et al. . |
| 4,179,551 | 12/1979 | Jones et al. .................. 526/262 |
| 4,183,839 | 1/1980 | Gagliana . |
| 4,183,839 | 1/1980 | Gagliani ....................... 525/419 |
| 4,189,560 | 2/1980 | Roth et al. . |
| 4,189,560 | 2/1980 | Roth et al. ................... 526/259 |
| 4,197,397 | 4/1980 | D'Alelio . |
| 4,197,397 | 4/1980 | D'Alelio ....................... 528/222 |
| 4,206,106 | 6/1980 | Heilman et al. . |
| 4,218,555 | 8/1980 | Antonoplos et al. . |
| 4,239,883 | 12/1980 | Stenzenberger . |
| 4,251,417 | 2/1981 | Chow et al. . |
| 4,251,418 | 2/1981 | Chow et al. . |
| 4,251,418 | 2/1981 | Chow et al. ................... 526/259 |
| 4,251,419 | 2/1981 | Heilman et al. . |
| 4,251,419 | 2/1981 | Heilman et al. ................ 528/172 |
| 4,251,420 | 2/1981 | Antonoplos . |
| 4,255,313 | 3/1981 | Antonoplos et al. . |
| 4,255,313 | 3/1981 | Antonoplos et al. ............ 528/172 |
| 4,269,961 | 5/1981 | Jones . |
| 4,269,961 | 5/1981 | Jones et al. .................. 526/262 |
| 4,273,916 | 6/1981 | Jones . |
| 4,273,916 | 6/1981 | Jones .......................... 528/117 |
| 4,276,407 | 6/1981 | Bilow et al. . |
| 4,288,607 | 9/1981 | Bier et al. . |
| 4,293,670 | 10/1981 | Robeson et al. . |
| 4,293,670 | 10/1981 | Robeson et al. ............... 525/436 |
| 4,297,472 | 10/1981 | Heiss . |
| 4,297,474 | 10/1981 | Williams et al. . |
| 4,298,710 | 11/1981 | Yamazaki et al. .............. 526/262 |
| 4,298,720 | 11/1981 | Yamazaki et al. . |
| 4,299,750 | 11/1981 | Antonoplos et al. . |
| 4,299,750 | 11/1981 | Antonoplos et al. ............ 528/125 |
| 4,375,427 | 3/1983 | Miller et al. . |
| 4,386,848 | 6/1983 | Cleudenin et al. . |
| 4,398,821 | 8/1983 | Stewart . |
| 4,405,770 | 9/1983 | Schoenberg et al. . |
| 4,414,269 | 11/1983 | Lubowitz et al. . |
| 4,476,184 | 10/1984 | Lubowitz et al. . |

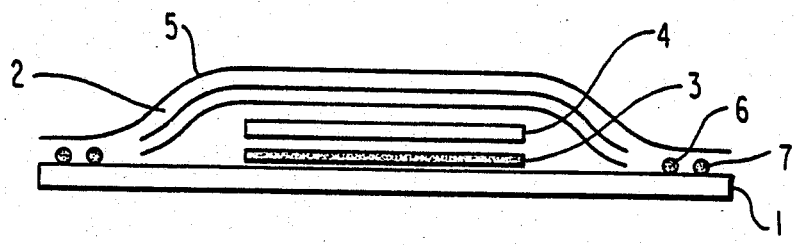

PHENOLIC-CAPPED IMIDE SULFONE RESINS

NOTICE OF GOVERNMENT RIGHTS

The United States Government, Department of the Navy, has rights in this invention pursuant to contract NASC-N0019-79-C-0203.

This is a continuation of application Ser. No. 576,790, filed Feb. 6, 1984, now abandoned, which is a continuation-in-part of application Ser. No. 321,119 filed Nov. 13, 1981, now abandoned.

BACKGROUND OF THE INVENTION

The present invention relates to resins formed from oligomers bearing chemically functional terminal groups. The backbones of the oligomers are polysulfones or polyether sulfones, and the functional groups have phenolic configurations. The functional groups are chemically attached to the backbones by imide moieties.

Composite materials are finding ever increasing utility in the structural engineering art of the aerospace industry. Emphasis is being placed on developing new composites and improved methods and resin systems for binding and holding the composite reinforcing materials together.

Although the most popular resins for composite matrices are epoxy resins, they suffer from two major deficiencies. First is their propensity to absorb moisture, which is deleterious to the mechanical properties of high performance structural composites. Property degradation may constitute an initial reversible degradation resulting from plasticization of the epoxy resin matrix by absorbed moisture or may constitute permanent degradation resulting from cracks in the epoxy resin matrix. The initial degradation can be predicted in neat epoxy resin castings based on standard diffusion models. Permanent degradation in composites cannot be predicted in any straightforward manner, however, and is influenced by thermal peaks during exposure. Consequently, there has been a need to provide resin systems for composite structures that do not suffer from moisture degradation.

The second major deficiency with epoxy resins is their brittle nature. The inherent brittleness of epoxy systems makes them highly susceptible to damage, causing aerospace designers to forego the potential weight savings of the composite system to achieve reliability. Although there are current systems that are damage tolerant (tough), they are thermoplastic in nature. The current systems that have the required toughness are the polysulfone and polyether sulfone systems.

Reinforced phenol-formaldehyde composites and laminates have long been in use. Such composites and laminates generally are not tough and are suitable only when high performance characteristics are unnecessary. Because such products have little or no elasticity, they fail to exhibit the impact resistance and crack propagation resistance needed for such high performance areas as in aircraft and space vehicles.

One attempt to improve the properties of available resin compositions is disclosed in U.S. Pat. No. 4,026,871 to D'Alelio. This patent discloses fitting phenolic groups to the ends of polymer chains that are fashioned with aromatic backbones. Unfortunately, the oligomers proposed by D'Alelio are not soluble in solvents used for making varnishes and therefore suffer from serious processing difficulties. The absence of suitable laminating varnishes has remained a serious problem in the fabrication of high performance, fiber-reinforced materials.

SUMMARY OF THE INVENTION

One of the objects of this invention is to provide suitable varnishes for fabricating high performance composites and laminates.

Another object is to provide oligomers bearing functional terminal groups of the phenolic configuration.

It is another object to make oligomers with backbones characterized by polysulfone and polyethersulfone moieties.

It is another object to realize varnishes with the above oligomers and compounds coreactive with such oligomers.

It is another object to make varnishes with the above oligomers, coreactants, and promoters.

Another object is to fabricate high performance composites and laminates, and in addition to fabricate adhesives.

Another object is to provide laminates that are tough, thermally stable, and resistance to attack by solvents and/or moisture.

Another object is to provide laminates that are chemically stable, particularly against oxidation.

Another object is to provide laminates that can be thermoformed.

To achieve the foregoing objects and in accordance with the purpose of the invention, as embodied and broadly described herein, the cross-linkable oligomer of the present invention is a product of:

(1) 2 moles 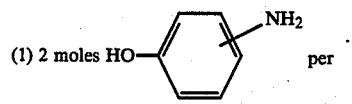 per (2) n+1 moles of at least one member selected from the group consisting of aromatic and aliphatic dianhydrides and (3) n moles of at least one member selected from the group consisting of polysulfones and polyethersulfones terminated with two amino groups;
wherein n is selected so that the oligomer has a molecular weight between about 800 and 5000.

The preferred molecular weight for the oligomer is between about 1000 and 2500.

Further to achieve the foregoing objects and in accordance with the purpose of the invention, as embodied and broadly described herein, the prepreg of the invention is formed by impregnating a fabric with a mixture comprising the above-described oligomer, an aldehyde, and a solvent.

Still further to achieve the foregoing objects and in accordance with the purpose of the invention, as embodied and broadly described herein, a cured, thermally stable, solvent-resistant composite product of the invention is formed by curing the above-described prepreg.

Still further to achieve the foregoing objects and in accordance with the purpose of the invention, as embodied and broadly described herein, the method for making the aforementioned oligomer comprises (a) mixing compounds (1), (2), and (3) in a solvent in the presence of an inert atmosphere, and (b) heating the mixture to react the compounds.

The accompanying drawing, which is incorporated in and constitutes a part of this specification, illustrates a method of curing the oligomer of the present invention and, together with the description, serves to explain the principles of the invention.

BRIEF DESCRIPTION OF THE DRAWING

The drawing illustrates the curing of fabric impregnated with the oligomer of the present invention in a vacuum bag.

DESCRIPTION OF THE PREFERRED EMBODIMENTS

Reference will now be made in detail to the presently preferred embodiments of the invention.

In accordance with the invention, the cross-linkable oligomer is formed by reacting:

(1) 2 moles HO 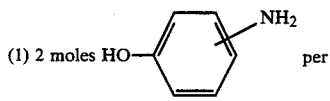 per (2) n+1 moles of at least one member selected from the group consisting of aromatic and aliphatic dianhydrides and (3) n moles of at least one member selected from the group consisting of polysulfones and polyethersulfones terminated with two amino groups, wherein n is selected so that the oligomer has a molecular weight between about 800 and 5000.

The cure product resulting from an oligomer with a molecular weight higher than 5000 will possess thermoplastic properties instead of thermosetting properties. Within the ranges described above, however, the cross-linked polymer has the beneficial properties of thermosetting resins without the disadvantages of epoxy resins or thermoplastic resins such as conventional phenol-formaldehyde resins.

In the product of this reaction, the functional phenolic groups are attached to the sulfone moiety through imide linkages. The reactants are reacted in a solvent in the presence of an inert atmosphere to prepare the oligomers, whose molecular weights are adjusted by adjusting the amounts of the three reactants. The reaction mixture is heated to react the compunds. Although heat alone is sufficient to drive the reaction, a chemical compound, such as acetic anhydride, may be added to aid the condensation reaction, employing a buffer, such as sodium acetate.

In the reaction the OH group of compound (1) remains reactive after the NH2 groups of compounds (1) and (3) are reacted with the anhydride groups of compound (2). As indicated above, the reaction product should have a molecular weight between about 800 and 5000, but it is preferably between about 1000 and 2500. Mixtures of oligomers having molecular weights within these ranges may also be used.

The oligomers of the present invention may be co-reacted with aldehydes and thermal cross-linked to form polymers that are insoluble while yielding products that when used with reinforcements possess highly desirable mechanical and chemical properties. The reaction of the oligomer with an aldehyde may be promoted by basic compounds, such as organic polyamines, or by acidic compounds, such as organic acids and dilute mineral acids. An example of a basic promoter is triethylene diamine. Examples of acidic promoters are paratoluene sulfonic acid and dilute hydrochloric acid.

The resins are advanced to a plastic or B stage by admixing them with the aforementioned coreactants and heating the mixture. When the cure reaction is carried out in the presence of fiber reinforcement, tough, fiber-reinforced components are fabricated.

Typical compounds holding the monofunctional groups that remain reactive used in the process of the invention include:

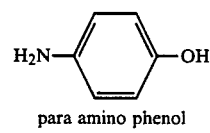

para amino phenol

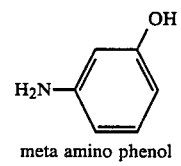

meta amino phenol

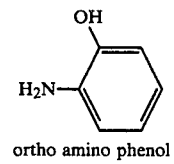

ortho amino phenol

In accordance with the present invention, as embodied herein, the dianhydride employed as compound (2) preferably is selected from the group consisting of

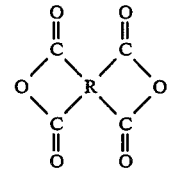

and 1,2,3,4 butane tetracarboxylic dianhydride, wherein R is an aromatic or an aliphatic radical.

Typical compounds holding the dianhydride that may be used in the process of the invention include:

pyromellitic dianhydride

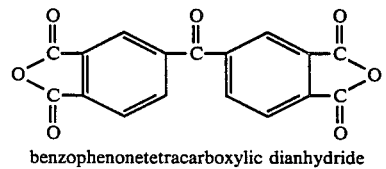

benzophenonetetracarboxylic dianhydride

A preferred aliphatic dianhydride that can be used in accordance with the present invention is:

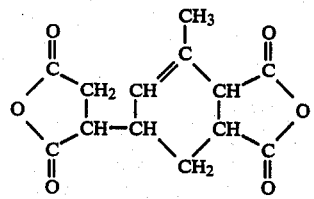

5-(2,4-diketotetrahydrofuryl)-3-methyl-3-cyclohexene-1,2-dicarboxylic anhydride (also known as MCTC).

Further in accordance with the present invention, as embodied herein, the member selected from the group consisting of polysulfones and polyether sulfones terminated with two amino groups is represented by the formula:

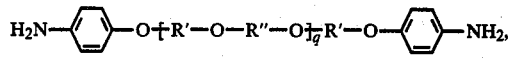

wherein R' and R" are aromatic radicals, and q is an integer between 0 and 4 inclusive. Preferably R' is selected from the group consisting of

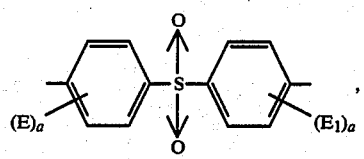

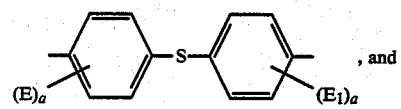

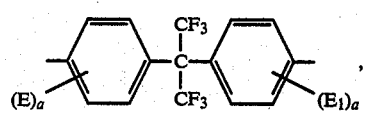

and preferably R" is selected from the group consisting of

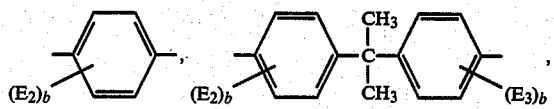

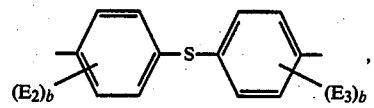

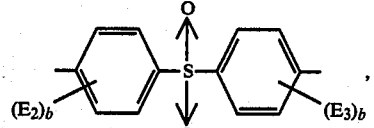

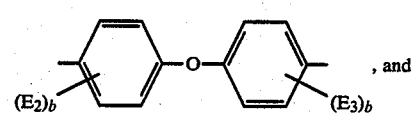

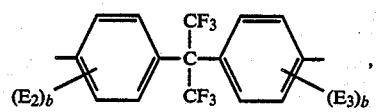

E, $E_1$, $E_2$, and $E_3$ each represent substituent groups selected from the group consisting of halogen, alkyl groups having 1 to 4 carbon atoms, and alkoxy groups having 1 to 4 carbon atoms, and a and b are each an integer having a value of 0 to 4.

Thus, typical compounds selected from the group consisting of polysulfones and polyether sulfones terminated with two amino groups include:

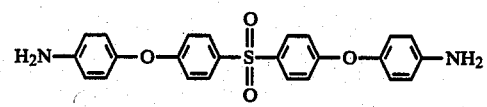

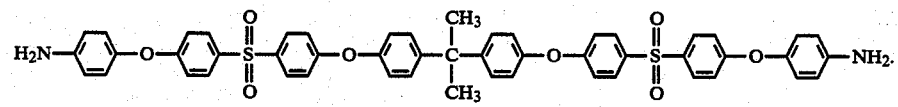

The most preferred compounds are those in which R' is

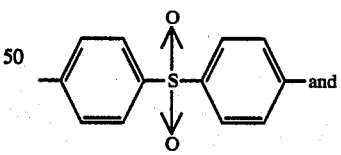 and

R" is 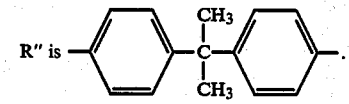.

The oligomers of the present invention are capable of coreaction with aldehydes and thermal cross-linking to form polymers that are insoluble. Typical compounds that can be used as coreactants in the process of the present invention include:

HCHO
Formaldehyde

-continued

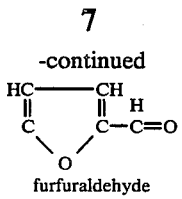
furfuraldehyde

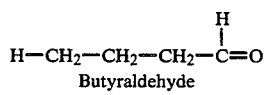
Butyraldehyde

Any aldehyde conventionally used in the art to cure phenolic resins may also be used in the present invention. Moreover, catalysts can be used to facilitate the reaction.

The oligomer of the present invention, as embodied herein, may be used to form a prepreg by impregnating fabric with a mixture of the phenol-containing imide sulfone, the coreactant, and a solvent. The prepreg may then be cured, such as by vacuum bagging and heating at an elevated temperature while under pressure. This is illustrated in the drawing, in which 1 is a caul (a metal backing for applying pressure and a surface finish), 2 is a vaccuum source, 3 is the prepreg, 4 is a pressure plate, 5 is a nylon film (duPont polyamide film), 6 is a silicon sealant, and 7 is an inorganic zinc chromate sealant tape (Kisch). The resulting product is a cured, thermally stable, solvent-resistant composite product. The cross-linked polymer may also be used, however, as an adhesive.

The following examples are presented to illustrate the various features of the invention.

EXAMPLE 1

Under dry $N_2$, to a solution of 180 g sulfone amine (formula molecular weight 2000), 9.8 g para amino phenol, 199.3 g dimethylacetamide, and 19.6 g toluene is added 43.5 g of benzophenonetetracarboxylic dianhydride while maintaining the temperature at 0° C. (in an ice bath). Then add 33.1 g acetic anhydride and 3.3 g sodium acetate maintaining temperature 1 hour at 10-25° C. then raising temperature to 80°-90° C. and holding 4 hours. Cool and stir at ambient conditions for 16 hours. Recover phenolic terminated sulfone oligomer by precipitation in $H_2O$. Precipitate is yellow and melts to clear solution at 240° C.

EXAMPLE 2

Add 9.51 g furfural with 2.28 g HCl to the oligomer produced in Example 1 and stir 15 minutes. Heat to reflux (132° C.) for 2-3 hours then cool. Obtain polymer by precipitation in $H_2O$. Precipitate is brown in color.

It will be apparent to those skilled in the art that various modifications and variations could be made in the invention without departing from the scope or spirit of the invention.

What is claimed is:

1. A cross-linkable oligomer formed by reacting:

(1) 2 moles 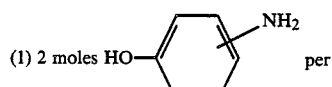 per (2) n+1 moles of an aliphatic dianhydride and (3) n moles of at least one member selected from the group consisting of polysulfones and polyethersulfones terminated with two amino groups, wherein n is selected so that said oligomer has a molecular weight between about 800 and 5000.

2. A cross-linkable oligomer formed by reacting:

(1) 2 moles 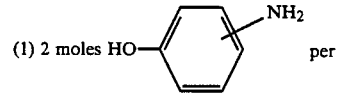 per (2) n+1 moles of an aliphatic dianhydride and (3) n moles of at least one compound having the formula

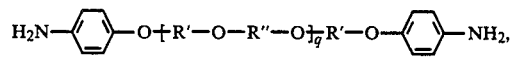

wherein n is selected so that said oligomer has a molecular weight between about 800 and 5000; q is an integer of 0 to 4 inclusive; and R' and R" are aromatic radicals at least one of which is a sulfone radical having the formula

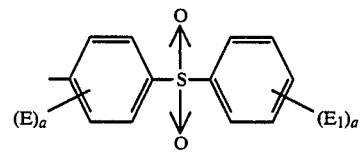

wherein E and $E_1$ each represent substituent groups selected from the group consisting of halogen, alkyl groups having 1 to 4 carbon atoms and alkoxy groups having 1 to 4 carbon atoms and a is an integer having a value of 0 to 4.

3. An oligomer according to claim 2, wherein q is 0 and R' is

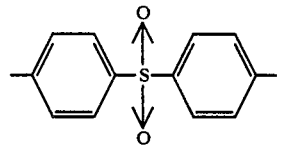

4. An oligomer according to claim 2, wherein R' is selected from the group consisting of

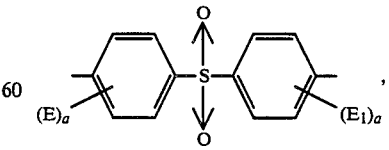,

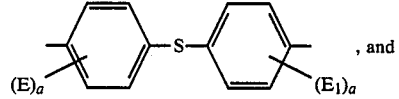, and

-continued

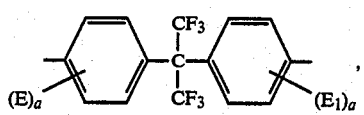, 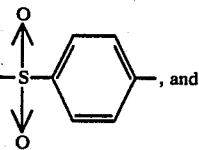, and

R" is selected from the group consisting of

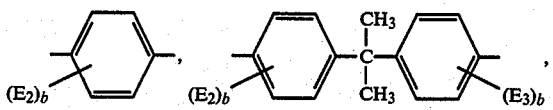,

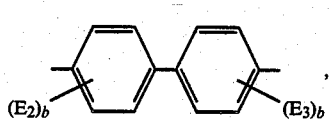,

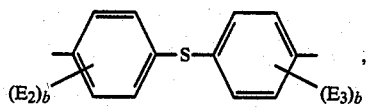,

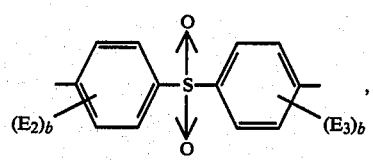,

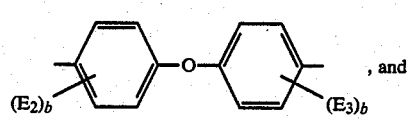, and

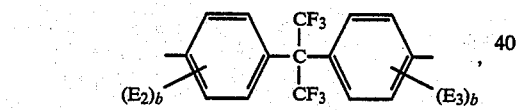,

E, $E_1$, and $E_3$ each represent substituent groups selected from the group consisting of halogen, alkyl groups having 1 to 4 carbon atoms, and alkoxy groups having 1 to 4 carbon atoms, and a and b are each an integer having a value of 0 to 4.

5. An oligomer according to claim 4 wherein R' is

R" is .

6. An oligomer according to claim 2, wherein n is selected so that said oligomer has a molecular weight between about 2500 and 5000.

7. An oligomer according to claim 1 wherein said aliphatic dianhydride is 5-(2,4-diketotetrahydrofuryl)-3-methyl-3-cyclohexene-1,2-dicarboxylic anhydride.

8. An oligomer according to claim 2 wherein said aliphatic dianhydride is 5-(2,4-diketotetrahydrofuryl)-3-methyl-3-cyclohexene-1,2-dicarboxylic anhydride.

9. A method for making the oligomer of claim 1, comprising
  (a) mixing compounds (1), (2), and (3) in a solvent in the presence of an inert atmosphere, and
  (b) heating said mixture to react said compounds.

10. The method of claim 9 wherein the mixture is refluxed for a predetermined time.

11. The product-of-the-process of mixing substantially stoichiometric amounts of the following compounds in a heated solvent under an inert atmosphere, the compounds comprising:
  2 moles of an aminophenol (A) per;
  n+1 moles of an aliphatic dianhyride (D); and
  n moles of a polyarylsulfone diamine or a polyarylethersulfone diamine (M),
    wherein n is selected so that the product has a molecular weight between about 800–5,000,
    and wherein the product has a general structural formula of:

$$A\!-\!\!\left[D\!-\!M\right]_{\overline{n}}\!D\!-\!A$$

12. The product of claim 11 wherein the diamine includes a phenoxy phenyl sulfone linkage.

13. The product of claim 11 wherein the aliphatic dianhydride is 5-(2,4-diketotetrahydrofuryl)-3-methyl-3-cyclohexene-1,2-dicarboxylic anhydride.

* * * * *